United States Patent [19]

Gollub

[11] Patent Number: 5,536,027
[45] Date of Patent: Jul. 16, 1996

[54] CONVERTIBLE RUNNING STROLLER

[76] Inventor: Matthew L. Gollub, 8 Ladue Estates, Creve Coeur, Mo. 63141

[21] Appl. No.: 282,898

[22] Filed: Jul. 29, 1994

[51] Int. Cl.⁶ ........................................ B60F 5/00
[52] U.S. Cl. .................. 280/30; 280/7.12; 280/47.38; 280/33.998
[58] Field of Search ................. 280/30, 35, 7.12, 280/204, 62, 47.38, 33.998

[56] References Cited

U.S. PATENT DOCUMENTS

| D. 239,523 | 4/1976 | Firth et al. | D12/129 |
|---|---|---|---|
| 2,628,847 | 2/1953 | Hawkins | 280/33.998 |
| 2,803,457 | 8/1957 | Thompson | 280/35 |
| 3,485,507 | 12/1969 | Christof | 280/30 |
| 3,829,113 | 8/1974 | Epelbaum | 280/30 |
| 4,902,287 | 2/1990 | Skelly | 280/33.998 |
| 5,123,670 | 6/1992 | Chen | 280/650 |
| 5,158,319 | 10/1992 | Norcia et al. | 280/643 |
| 5,188,389 | 2/1993 | Baechler et al. | 280/650 |
| 5,224,720 | 7/1993 | Chaw et al. | 280/62 |

FOREIGN PATENT DOCUMENTS

| 953381 | 9/1949 | France . | |
| 2227719 | 11/1974 | France . | |
| 2308535 | 11/1976 | France | 280/33.998 |

*Primary Examiner*—Christopher P. Ellis
*Attorney, Agent, or Firm*—Polster, Lieder, Woodruff & Lucchesi

[57] ABSTRACT

An adapter or module is provided to convert a walking stroller to a jogging stroller. The adapter includes an adapter frame having side members and at least one end member, ground engaging wheels rotatably mounted to the frame, and at least one clamp mounted to each adapter frame side member to releasably hold the stroller's frame, to secure the stroller frame to the adapter. The clamps are mounted to the side members so that they can be selectively positioned along the side members. The end member is secured to the side members so that the width of the adapter frame can be altered. The adapter frame can thus be used with strollers of varying widths and lengths.

16 Claims, 2 Drawing Sheets

CONVERTIBLE RUNNING STROLLER

RELATED APPLICATION DATA

This application is based on the disclosure made in Disclosure Document 348,149, entitled The Stroller Jogger, filed Jan. 26, 1994, and which is incorporated herein by reference.

BACKGROUND OF THE INVENTION

This invention relates to strollers, and in particular, to an adapter used to convert a walking stroller to a running stroller.

Parents with young children often have a stroller to take children with them on walks. If either of the parents is a runner or jogger, they may also have a second, jogging stroller which they use to take the children with them when they jog. Jogging strollers are typically made with larger wheels than walking strollers to enable the jogging stroller to be used on rougher terrain (such as old sidewalks, for example), without jostling the child in the stroller too much. Wheels on conventional strollers are typically small and can vibrate when the stroller is moved quickly, such as during a brisk walk.

Strollers typically are expensive. The need to own two strollers, one for walking and one for jogging, drastically increases the cost of the strollers needed for a parent who jogs. Further, the strollers can take up a considerable amount of room when stored. The need to store two strollers reduces the space which could be used to store other household items.

SUMMARY OF THE INVENTION

One object of the invention is to provide a stroller which may be used for both jogging and walking.

Another object is to provide such a stroller which may be converted from a walking stroller to a running stroller.

Another object is to provide an adapter to convert a walking stroller to a jogging stroller.

Another object is to provide such an adapter which may be used with many types of commercially available strollers.

Another object is to provide such an adapter which will provide a smoother ride for the child in a stroller when the stroller is moved over rough terrain, such as old sidewalks or sidewalks which are broken or heaving from tree roots.

Another object is to provide such an adapter which is easy to use.

Another object is to provide such an adapter which is economical to produce.

Another object is to provide such an adapter which eliminates the duplication of seats, handles, and seat belts.

These and other objects will become apparent to those skilled in the art in light of the following description and accompanying drawings.

In accordance with the invention, generally stated, an adapter is provided for converting a walking stroller to a jogging stroller. As is common, the walking stroller has a stroller frame, a seat on the frame in which a child may sit, and wheels rotatably secured to the frame. The adapter includes an adapter frame having side members and at least one end member, ground engaging wheels rotatably mounted to the frame, and at least one clamp mounted to each adapter frame side member to releasably hold the stroller frame to secure the stroller frame to the adapter. Preferably there are four clamps, two on each side member to clamp onto the front and back of the stroller frame. The stroller may include a cross-bar between the front legs. The adapter wheels are preferably sized so that the stroller's front and rear wheels are raised off the ground when the stroller is secured to the adapter.

The clamps are each mounted on a clamp bracket. The clamp brackets are slidable along the adapter side members and operable to secure the bracket, and hence its associated clamp, at a desired position along the side members. This enables the adapter to be used with strollers of varying lengths. To facilitate connection of the clamps to the stroller, the clamps are preferably rotatably mounted on to the brackets.

The adapter is preferably triangular in shape. The side members are secured together at their front ends by the front wheel and the end member extends between the side members. The end member is slidably secured to the side members so that the end member can be moved along the side members and be releasably fixed in a desired position. This allows the width of the adapter to be altered to accommodate wider strollers. Preferably, the end member has spaced apart brackets through which the side members slide. The brackets may be loosened to allow the end member to be moved to a desired position along the side members to change the width of the adapter, and then tightened to secure the end member in that desired location.

DESCRIPTION OF THE PREFERRED EMBODIMENT

Figure 1:
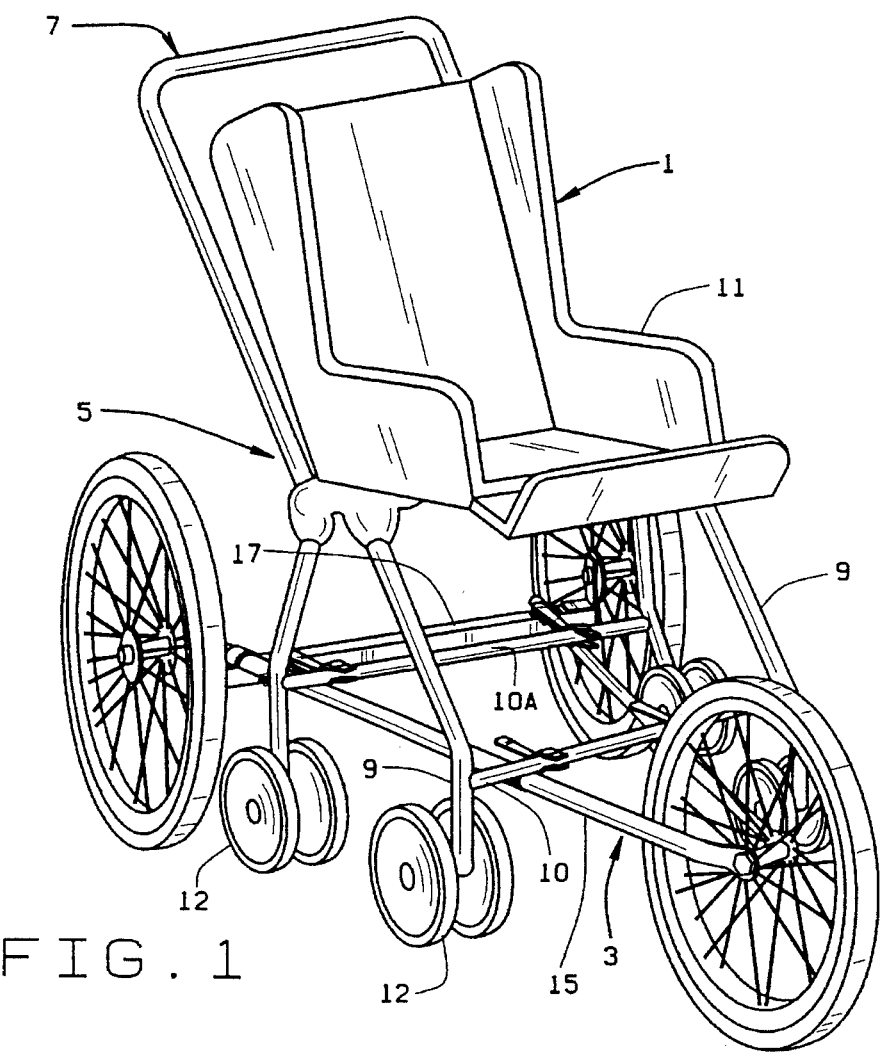
FIG. 1 is a perspective view of a stroller mounted on an adapter of the present invention to convert the stroller from a walking stroller to a running or jogging stroller.
Figure 2:
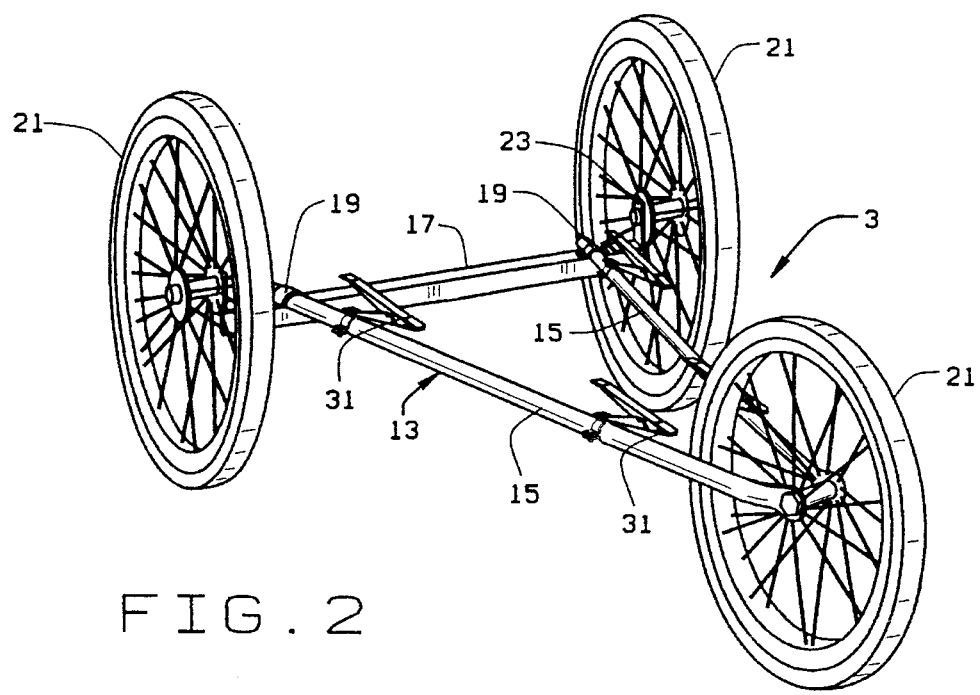
FIG. 2 is a perspective view of the adapter.
Figure 3:
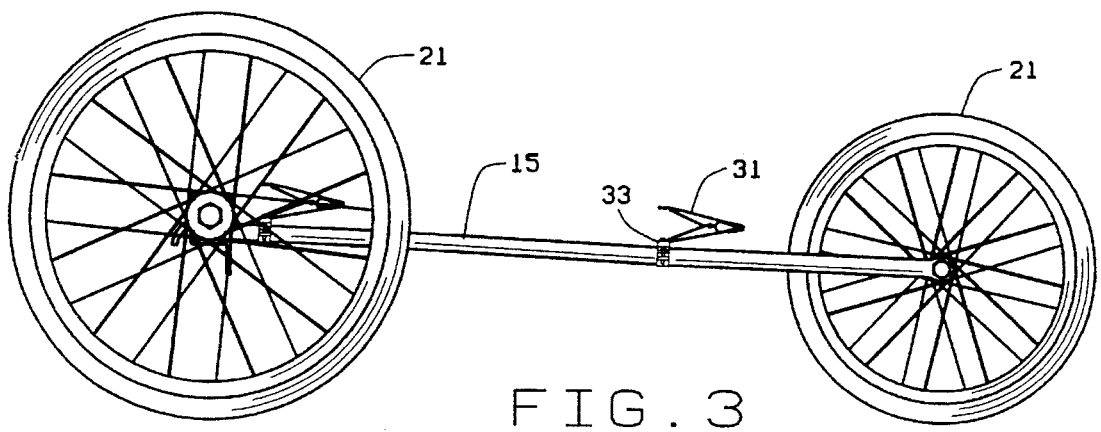
FIG. 3 is a side elevational view of the adapter.
Figure 4:
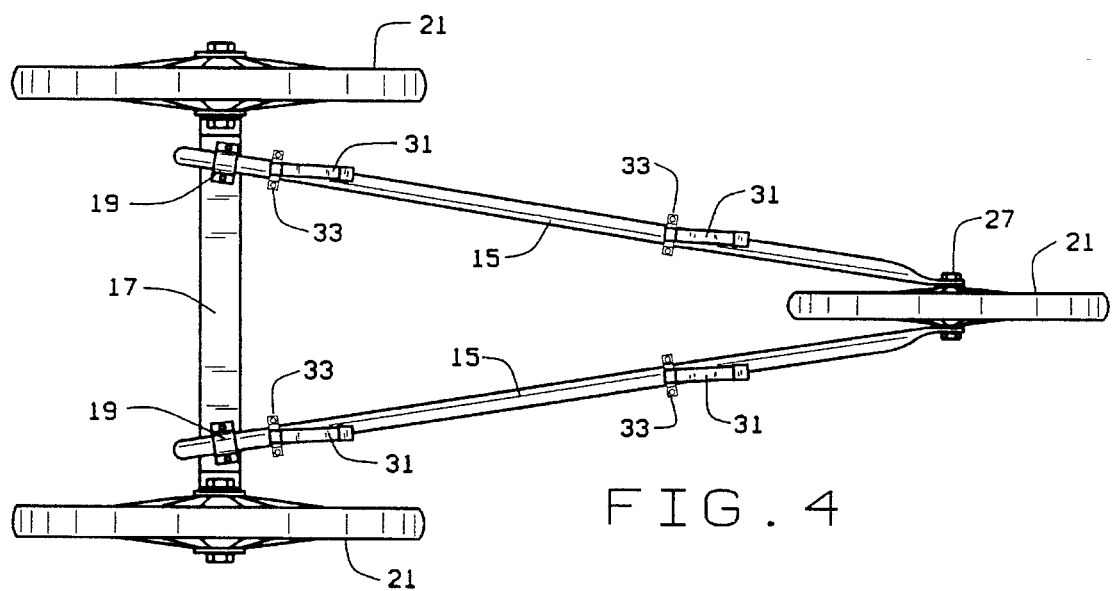
FIG. 4 is a top plan view of the adapter.
Figure 5:
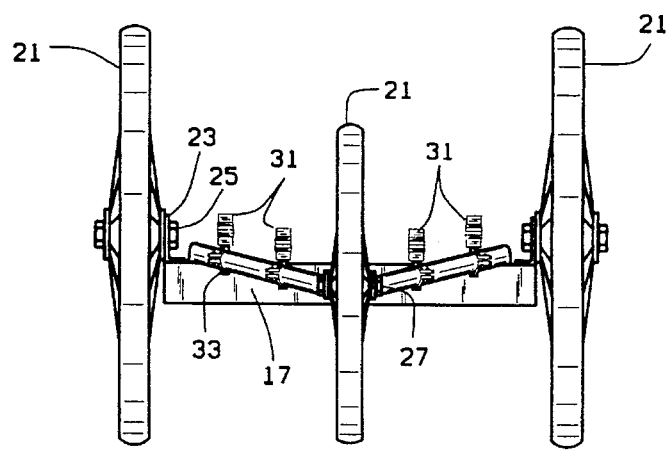
FIG. 5 is a front elevational view of the adapter.

In FIG. 1, a stroller 1 is shown mourned on one illustrative embodiment of an adapter 3 of the present invention. The stroller may be any commercially available stroller and typically includes a stroller frame 5 having a handle 7 used to push the stroller and legs 9. A cross-bar or member 10 extends between the front legs of the stroller to provide strength and rigidity to the stroller. A second cross-bar 10A extends between the strollers rear legs. Some strollers have a basket beneath the stroller, at its back, which serves to hold items and to provide strength and rigidity to the stroller. A seat 11 is mounted on the frame and is sized, as is known, so that a child may sit in the stroller. Although not shown, the seats typically include restraints to ensure that the child will not get out of the stroller. Wheels 12 are rotatably mounted to the end of the legs.

Adapter 3 is better shown in FIGS. 2–5. Adapter 3 includes an adapter frame 13 which is preferably triangular. The adapter could be formed in other shapes, such as rectangular. The frame is generally planar and has side members 15 which are joined together at their fronts, and an end member 17 which extends between the back ends of members 15. Although the side members could be secured to end member 17 such as by welding or using nuts and bolts, brackets 19 are used to secure the end member to the side members. The use of brackets 19 allows for the width of adapter 3 to be altered. By loosening brackets 19, side members 15 can slide through the brackets to change the distance between the front of the adapter and end member 17. The brackets can then be tightened when they are at a desired point along the side members. Because the side members are joined at their fronts, moving end member 17 along the side members will change the distance between the side members, allowing the adapter to be used with strollers of varying widths. By moving the end member forward, the adapter width can be changed to accommodate wider strollers, and by moving the end member rearwardly, the adapter width can be changed to accommodate narrower strollers. Preferably, the adapter width is set so that the width of the adapter at the end member is slightly narrower than the distance between the rear legs of the stroller.

Wheels 21 are rotatably mounted to the frame to support adapter 3 above the ground and to enable the adapter to be easily moved. Wheels 21 are preferably spoked wheels with a circumference and diameter larger than those of the stroller wheels 13. Thus, at least the front wheels of the stroller, and preferably both the stroller's front and rear wheels, will be raised above ground level. Two of the wheels 21 are secured to the ends of adapter end member 17. An L-bracket 23 (FIG. 5) is secured by one of its legs to the end member. A second leg of bracket 23 extends upwardly to receive an axle 25 about which the adapter wheel is journaled.

The front wheel is preferably smaller in diameter than the two rear wheels. This gives the adapter a slight slope, the rear of the adapter being slightly higher than the back of the adapter. The front wheel is rotatably journaled on an axle 27 extending between the fronts of the side members 15. Front axle 27 serves to connect the side members together at their fronts.

A plurality of clamps 31 (preferably four) are secured to the adapter side members 15 (e.g. there are two clamps along each side member). Clamps 31 are shown to be clips, which are used to clamp to the stroller frame 5 to secure the stroller to the adapter. Any other type of clamp could be used. All that is necessary is that the clamp be able to securely grab the stroller frame. Preferably, clamps 31 are secured to side members 15 by two piece brackets 33, each bracket having a lower piece positioned beneath the side member and an upper piece placed on top of the side member. The upper and lower pieces are then connected together by screws, bolts or the like. When the bracket screws are tightened, the bracket 33 will be secured in place on the side member. The use of these brackets allows the position of the brackets to be changed. Brackets 33 may be loosened so that clamps 31 may be moved to a desired location along member 15 and then secured in that desired position. The ability to move the clamps along the adapter frame enables the adapter to be used with strollers of different lengths.

The clamps are preferably mounted on brackets 33 so that they may be pivoted about the bracket. This allows the clamp to be rotated into and out of clamping position to facilitate securement and removal of the stroller to the adapter.

As can be appreciated, the use of the adapter is quite simple and eliminates the need to purchase a second, jogging, stroller. Because the adapter has a relatively narrow profile, compared to a stroller, it takes up less space when stored.

In operation, the stroller 1 is placed on the adapter 3 with the cross-members 10 and 10A of the stroller sitting or resting on the side members 15 of the adapter. If there is no back cross-member, the stroller's rear wheels will be engage the ground. This will give the stroller seat a slight rearward tilt. If the stroller has a rear cross-member (as many strollers do), the clamps are positioned so that the stroller will have a slight rearward tilt. This will prevent the child in the stroller from having a sensation of leaning forward. Further, the rearward tilt will be more comfortable for the child. The position of clamps 33 is then adjusted so that the clamps can securably clamp onto the cross-members 10 and 10A. The clamps are then operated to grasp the cross-members to secure the stroller to the adapter. The position of clamps 33 need only be adjusted once, if the adapter is to be used with only one stroller. Once the clamps are positioned, they need not be moved again and to secure the stroller to the adapter, the stroller is simply placed on the adapter and the clamps are operated to engage the stroller cross-members. To remove the stroller from the adapter, the clamps are released and rotated out of the way. Once all the clamps have been released, the stroller is simply lifted off the adapter and it is ready for use when walking.

The foregoing description is set forth for illustrative purposes only and is not intended to be limiting. Variations within the scope of the appended claims may be apparent to those skilled in the art. For example, side members 15 could be made to be telescoping so that the adapter could be used with even long strollers (i.e. tandem strollers). Instead of using two rear axles, one for each back wheel, a single axle could extend across the back of the adapter and the rear wheels could then be journaled on this single axle. If a single rear axle is used, the rear axle could replace the adapter end member 17. These examples are merely illustrative.

I claim:

1. In combination a stroller and an adapter;

said stroller including a stroller frame, a seat mounted on said frame in which a child can sit, and ground engaging wheels rotatably mounted to said stroller frame so that said stroller can be pushed along said ground;

said adapter including an adapter frame having elongate side members, at least one end member, ground engaging wheels, and clamps which removably grasp said stroller frame to positively secure said stroller frame to said adapter to convert said stroller to a jogging stroller; said clamps being mounted to said stroller frame such that said clamps are pivotal as a unit about an axis generally perpendicular to the side member to which said clamp is mounted.

2. The combination of claim 1 wherein said stroller frame includes front legs and back legs, said wheels being mounted at an end of said legs, and a cross-bar extending between one of said front and back legs; said cross-bar sitting on said adapter side members; said clamps being secured to said adapter side members, said clamps being positioned to releasably grasp said roller frame cross-bar.

3. The combination of claim 1 wherein said clamps are slidably mounted to said adapter side members so that the horizontal distance between said clamps can be changed.

4. The combination of claim 3 wherein said clamps are mounted on a bracket, said bracket being slidable along said adapter side members and operable to secure said bracket, and hence said clamp, at a desired position along said side members.

5. In combination a stroller and an adapter;

said stroller including a stroller frame, a seat mounted on said frame in which a child can sit, and ground engaging wheels rotatably mounted to said stroller frame so that said stroller can be pushed along said ground;

said adapter including an adapter frame having elongate side members, at least one end member, ground engaging wheels, and clamps which removably grasp said stroller frame to positively secure said stroller frame to said adapter to convert said stroller to a jogging stroller;

said clamps being mounted on a bracket, said bracket being slidable along said adapter side members and operable to secure said bracket, and hence said clamp, at a desired position along said side members, such that the horizontal distance between said clamps can be changed;

wherein said clamps hold said stroller such that said stroller has a rearward tilt when secured to said adapter.

6. In combination a stroller and an adapter;

said stroller including a stroller frame, a seat mounted on said frame in which a child can sit, and ground engaging wheel rotatably mounted to said stroller frame so that said stroller can be pushed along said ground;

said adapter including an adapter frame having elongate side members, at least one end member, ground engaging wheels, and clamps which removably receive said stroller frame to secure said stroller frame to said adapter to convert said stroller to a jogging stroller, said clamps holding said stroller such that said stroller has a rearward tilt when secured to said adapter;

said clamps being slidably mounted to said adapter side members so that the horizontal distance between said clamps can be changed, each of said clamps being mounted on a bracket, said bracket being slidable along said adapter side members and operable to secure said bracket, and hence said clamp, at a desired position along said side members;

said adapter being generally triangular in shape; said side members being secured together at front ends thereof, said end member extending between side members, said end member being slidably secured to said side members so that said end member can be moved along said side members and releasably fixed in a desired position.

7. The combination of claim 6 including spaced apart brackets mounted on said end member, said side members being slidably received in said end member brackets.

8. The combination of claim 5 wherein said adapter wheels are sized so that at least one of said stroller front wheels and back wheels are out of contact with said ground when said stroller is secured to said adapter.

9. The combination of claim 8 wherein both said front and back wheels of said stroller are out of engagement with said ground when said stroller is secured to said adapter.

10. An adapter for converting a walking stroller to a jogging stroller, the walking stroller having a stroller frame, a seat on said frame in which a child may sit, and wheels rotatably secured to said frame; said adapter including an adapter frame having side members, at least one end member, ground engaging wheels rotatably mounted to said frame, and spring clamps mounted to said adapter frame which releasably grasp said stroller frame to secure said stroller frame to said adapter, said clamps being pivotally mounted to said adapter such that said clamps are pivotal, as a unit, in a plane substantially parallel to the plane of said adapter frame about an axis substantially perpendicular to said adapter frame.

11. The adapter of claim 10 wherein said adapter wheels are sized to prevent contact of the stroller wheels with the ground.

12. The adapter of claim 10 wherein said clamps are secured to said side members, said clamps removably engaging cross-members of said stroller to secure said stroller to said adapter.

13. The adapter of claim 12 wherein said clamps are slidable along said adapter side members.

14. The adapter of claim 13 wherein said clamps are mounted on a bracket, said bracket being slidable along said adapter side members and operable to secure said bracket, and hence said clamp, at a desired position along said side members.

15. An adapter for converting a walking stroller to a jogging stroller, the walking stroller having a stroller frame, a seat on said frame in which a child may sit, and wheels rotatably secured to said frame; said adapter including:

an adapter frame having side members and at least one end member, said adapter frame being generally triangular in shape; said side members being secured together at from ends thereof, said at least one end member extending between side members and being slidably secured to said side members so that said at least one end member can be moved along said side members and releasably fixed in a desired position;

ground engaging wheels rotatably mounted to said frame;

at least one clamp mounted to each of said adapter frame side members to releasably hold said stroller frame to secure said stroller frame to said adapter, each said clamp being mounted on a bracket, said bracket being slidable along said adapter side members and operable to secure said bracket, and hence said clamp, at a desired position along said side members; and means for changing the position of said clamps on said side members.

16. The adapter of claim 15 wherein said clamp is rotatably mounted on said bracket.

* * * * *